United States Patent
Schwarz

[15] 3,703,136
[45] Nov. 21, 1972

[54] PHOTOGRAPHIC CAMERA WITH INTERCHANGEABLE OBJECTIVE SHUTTER

[72] Inventor: Gerhard Schwarz, Munich, Germany

[73] Assignee: Compur-Werk Gesellschaft mit beschrankter Haftung & Co., Munich, Germany

[22] Filed: Oct. 16, 1970

[21] Appl. No.: 81,324

[30] Foreign Application Priority Data

Oct. 22, 1969 Germany..........P 19 53 229.7

[52] U.S. Cl..................................95/42, 95/45
[51] Int. Cl..............................G03b 19/12
[58] Field of Search..................95/42, 45

[56] References Cited

UNITED STATES PATENTS

| | | |
|---|---|---|
| 3,254,584 | 6/1966 | Okajima..................95/42 |
| 3,427,945 | 2/1969 | Ettischer..................95/42 |
| 3,487,759 | 1/1970 | Fahlenberg................95/42 |

Primary Examiner—Samuel S. Matthews
Assistant Examiner—E. M. Bero
Attorney—Charles Shepard and Stonebraker & Shepard

[57] ABSTRACT

A camera body, preferably of the single lens mirror reflex type, having provision for interchangeably receiving various objective shutter units, each unit containing its own individual shutter. The camera body is useful both with shutter units of older type in which the timing of the shutter is controlled mechanically, and with shutter units of newer type in which the shutter timing is controlled electronically. The body contains mechanism for synchronizing the movement of the movable parts within the camera body with the movement of the movable parts in the shutter unit, whether the shutter unit be of the mechanically-timed type or of the electronically timed type.

6 Claims, 9 Drawing Figures

PHOTOGRAPHIC CAMERA WITH INTERCHANGEABLE OBJECTIVE SHUTTER

BACKGROUND OF THE INVENTION

In the photographic camera art, it is well known to employ interchangeable objectives or lenses selectively placed on an appropriate camera body, so that one may selectively use lenses of different focal lengths. The interchangeable objectives may be divided into two main types: those containing a shutter as part of the interchangeable assembly, and those not containing a shutter, the shutter being built into the camera body and remaining with the camera body when the lens assembly is changed. It is to the first type, involving an individual shutter as part of each separate lens assembly, that the present invention relates. The interchangeable assembly, comprising the lens components and the shutter, and usually also an adjustable diaphragm, may be conveniently referred to as an objective shutter unit.

Such objective shutter units are known per se. They are, of course, more expensive than interchangeable lens assemblies which contain no shutter, because of the added expense of the shutter, but there are advantages in having a separate shutter with each separate lens. In former years, the timing or "speed" of a photographic shutter, regardless of whether it was part of an interchangeable objective shutter unit or whether it was built into the camera body, was customarily controlled mechanically, by clock work or the like. In more recent years, there has been a tendency to control the shutter timing or "speed" by electronic controlling means as distinguished from the older clock work or other mechanical controls. The operation of the moving parts of a shutter built into and forming part of an interchangeable objective shutter unit must usually be synchronized with the operation of various moving parts within the camera body, and this is particularly true in the case of cameras of the type commonly called single lens mirror reflex cameras, where the movements of the reflex mirror and the film-protecting flap from viewing position to picture taking position and vice versa must be accurately correlated or synchronized with the movements of the shutter blades and the diaphragm leaves from viewing position to commencement-of-exposure position and then through the exposure making cycle and then back to viewing position.

Because of this necessity of synchronizing movement of parts within the camera body with the movement of parts within the interchangeable objective shutter unit, there must be various operative connections between moving parts within the camera body and moving parts within the interchangeable unit. In the past, it has not been practical to substitute a unit with a mechanically timed shutter for a unit with an electronically timed shutter, on the same camera body, because of the entirely different operative synchronizing connections required between the shutter parts and the camera body parts in the case of an electronically timed shutter, as compared with the connections in the case of a mechanically timed shutter. But the inability to interchange a mechanically timed unit with an electronically timed unit has been recognized as a great disadvantage, particularly in view of the relatively high cost of high grade interchangeable units incorporating shutters therein. For example, a person may already have two units with lenses of different focal lengths, such as normal and wide angle, in which the shutters are of the older mechanically timed type, and he may wish to add to his equipment an interchangeable unit of a different focal length, such as a telephoto lens, but would prefer that the shutter of the new unit be of the newer type, with the timing controlled electronically rather than mechanically. Until the present invention, this would require having two separate camera bodies, one to receive and synchronize with the operation of the older units with mechanically timed shutters, and another to receive and synchronize with the operation of the desired newer unit having an electronically timed shutter. Or again, the owner of a camera body built to receive and operate with an interchangeable unit having an electronically controlled shutter might have an excellent opportunity to acquire additional interchangeable units of different focal lengths that he greatly desired, but with shutters therein timed mechanically, but he could not avail himself of the opportunity to acquire such units of older style, for use with his camera body which would operate only with the newer style units with electronically timed shutters.

It is an important object of the present invention to provide an improved camera body which may be used effectively with and will synchronize its movements with the movements of either an interchangeable objective shutter unit of the mechanically timed shutter type or an interchangeable objective shutter unit of the electronically timed shutter type, so that both types of such units may be selectively used on the same camera body.

Another object of the invention is the provision of such a camera body incorporating the necessary parts of a single lens mirror reflex camera, and including the various control parts necessary to synchronize the movements of the mirror mechanism with the viewing movements and exposure movements of the shutter mechanism, regardless of whether the shutter is timed mechanically or is timed electronically.

Still another object of the invention is the provision of a camera body designed to receive and operate satisfactorily with an interchangeable objective shutter unit of a preexisting conventional construction in common use, with a mechanically timed shutter, and also to receive and operate satisfactorily with an interchangeable objective shutter unit of different type, with electronically timed shutter, one of the interchageable units having a part which, when the unit is mounted on the camera body, will render ineffective certain of the moving parts within the camera body which are needed for proper operation when the other such unit is mounted on the camera body.

A further object of the invention is the provision of a simple and sturdy construction in which electronic circuit parts within the camera body are automatically connected to electronic circuit parts within the interchangeable objective shutter unit by the mere act of mounting the interchangeable objective shutter unit in proper position on the camera body.

DESCRIPTION OF THE PREFERRED EMBODIMENT

The broad aspect of the present invention is applicable to various types of cameras having interchangeable shutter units. The invention finds its greatest usefulness, however, in connection with the type of camera known as a single lens mirror reflex camera, such a camera being here illustrated as a preferred embodiment of the invention.

Figure 1:
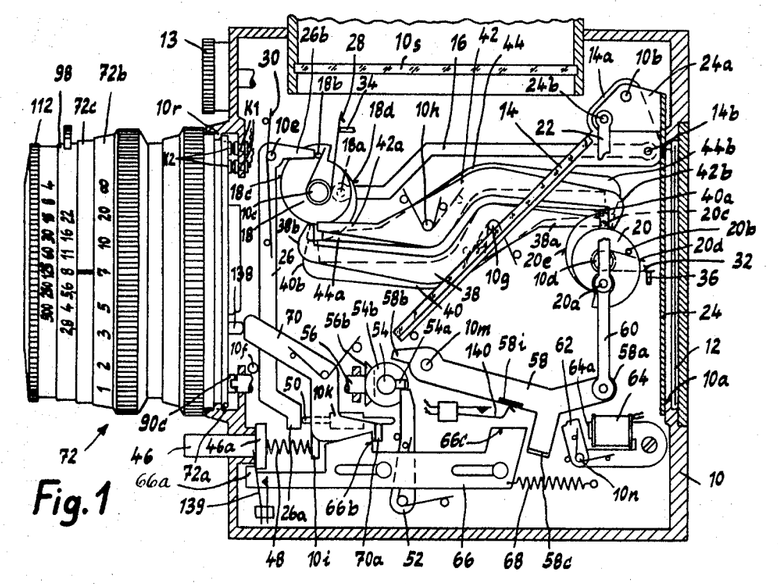
FIG. 1 is a view mainly in vertical section, taken on a longitudinal plane parallel to the optical axis, through a camera body of the single lens mirror reflex type according to a preferred embodiment of the invention, illustrating in side elevation an interchangeable objective shutter unit with electronic timing control mounted on the camera body, the various parts being shown in tensioned or cocked condition with the mirror and the protecting flap in viewing position.

Referring first to FIG. 1, the camera body comprises a housing indicated in general at 10, having the usual conventional means for guiding a film strip 12 and for advancing the film strip step by step past an exposure area defined by a rectangular opening 10a formed in a wall portion immediately in front of the film strip. The film winding knob accessible externally on the camera body is shown schematically at 13, and is operatively connected in any suitable known way to the conventional film feeding parts.

Near the upper rear part of the interior of the camera is a fixed spindle 10b extending transversely to the optical axis. The reflex mirror 14 is mounted on a mirror carrier 14a which is pivotally mounted on this spindle 10b. A connecting link 16 is pivoted at one end to the mirror carrier, at 14b, and the other end of the connecting link is pivoted at 18a to a control disk 18 which is rotatable within the camera housing on a transverse pin 10c located near the front of a side wall of the camera. A second control disk 20 is rotatable on another transverse pin 10d near the rear of the side wall of the camera. A connecting link 22 is pivoted at its lower end to the disk 20, at 20a, and pivoted at its upper end, at 24b, to a flap carrier 24a which carries the protecting flap 24 and which is pivoted on the same spindle 10b on which the mirror carrier 14a is mounted.

The flat control disks 18 and 20 are arranged at the side wall of the camera housing 10, with their planes of rotation parallel to and offset laterally from the optical axis, and in a position which will not obstruct the swinging movements of the reflex mirror 14 or the cover flap 24. The disk 18 is impelled in a counterclockwise direction by a spring 28 which is wound a number of times around the pin 10c and which engages at one end with a pin 18b projecting laterally from the disk 18. The other end of the spring engages an abutment element 34 further mentioned below. The other control disk 20 is similarly impelled in a counterclockwise direction by a spring 32 which is similarly wound a number of times around the pivot pin 10d and which has one end engaging the pin 20b projecting laterally from the disk 20, while the other end of the spring is held by an abutment element 36 further mentioned below.

A latch lever 26 is pivotally mounted on a pin 10e in the camera housing 10, and is biased in a clockwise direction by a spring 30. This latch lever has a long arm 26a extending downwardly from the pivot 10e, and a short arm 26b extending rearwardly from the pivot 10e to engage with the pin 18b on the control disk 18, latching this control disk against counterclockwise movement until the lever is displaced from its latching position.

The movements of the control disks 18 and 20 are always in a counterclockwise direction, and during any picture taking cycle, each disk turns through one complete revolution. The abutments 34 and 36 of the respective driving springs remain stationary during the picture taking cycle, and then when the film is fed ready for the next picture taking cycle, the abutments 34 and 36 are moved counterclockwise through 360° around their respective control disks, through suitable connections (not shown) from the film feeding mechanism, thereby winding up the driving springs 28 and 32 again, ready for the next picture taking cycle.

The control disk 20 has a laterally extending abutment pin 20c. The rear end 38a of a latch lever 38 temporarily lies in front of this pin 20c and latches the disk 20 against counterclockwise rotation under the influence of its spring 32. This latch lever 38 is pivotally mounted intermediate its ends on a pin 10g in the camera housing 10, side by side with another latch lever 40 which is approximately parallel thereto. The rear arm 40a of the lever 40 also cooperates with the pin 20c.

On another mounting pin 10h in the housing 10, there are pivotally mounted two additional latch levers 42 and 44 which are side by side and parallel to each other. These latch levers have forward ends 42a and 44a respectively, both of which cooperate with the pin 18b projecting laterally from the control disk 18. The end 44a is a little shorter than the end 42a, so that if the counterclockwise rotation of the disk 18 is stopped by engagement of the pin 18b with the end 42a, and if this end is swung aside, the disk 18 can rotate only a slight additional distance counterclockwise until the pin 18b engages the latch end 44a, and will be held in this position until the latch lever portion 44a is swung aside. Each of the latch levers 38, 40, 42, and 44 is spring biased in a clockwise direction. The front end 38b of the latch lever 38 coacts with a cam edge 18c on the control disk 18, and the front end 40b of the latch lever 40 coacts with a cam edge 18d on the control disk 18. These cam edges 18c and 18d are slightly offset in a direction axially of the cam disk, so that the levers 38 and 40 will not obstruct one another. In a somewhat similar way, the rear ends 42b and 44b on the respective latching levers 42 and 44 cooperate with cam edges 20d and 20e respectively on the control disk 20.

Figure 4:
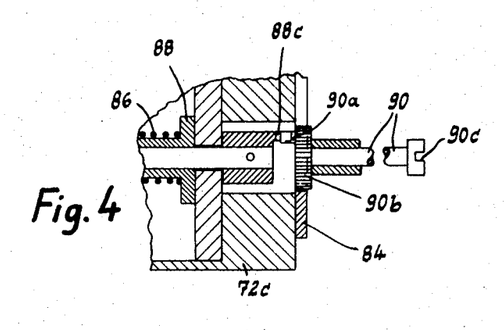
FIG. 4 is a fragmentary section on a larger scale illustrating details of the shutter shown in FIG. 3.

The camera trip member or trigger member 46 is in the form of a plunger displaceably mounted in the housing 10 with its axis parallel to the optical axis of the camera. A spring 48 pressing rearwardly against a fixed stop 10i in the camera housing and pressing forwardly on the trip plunger, urges the trip member forwardly to the normal rest position illustrated in FIG. 1. When the plunger is pressed inwardly or rearwardly to the release position illustrated in FIG. 2, a collar 46a thereon engages the lower arm 26a of the previously mentioned latch lever 26, and swings this latch lever slightly on its pivot 10e, displacing the arm 26b from its obstructing position with relation to the pin 18b on the control disk 18, so that the control disk can commence its counterclockwise rotation under the influence of its spring 28. Simultaneously, the lower arm 26a of the latching lever presses rearwardly against the front end of a pin 50 which extends parallel to the optical axis and is longitudinally movable in a fixed bearing 10k. This causes the rear end of the pin 50 to press against and displace a latch lever 52, which is mounted on a fixed pivot at its lower end as illustrated, and extends upwardly therefrom to an upper end adapted to engage a projection 54a on a conical pinion or bevel gear 54b fixed on a spindle 54 which extends in a direction transverse to the optical axis. The gear 54b meshes in turn with another conical pinion or bevel gear 56b which is secured to a spindle 56 mounted in suitable bearings in the housing 10 and extending parallel to the optical axis. The front end 56a of this spindle 56 projects forwardly through the front wall of the camera body and constitutes a coupling claw cooperating with the rear end 90c (FIGS. 1, 2, and 4) of a shaft 90 (FIG. 4) in the interchangeable objective shutter unit applied to the front of the camera body, which shaft 90 and its function will be further described below. The spindle 54 is operatively coupled by conventional mechanism with the film feeding or transport mechanism of the camera (winding knob 13 and associated parts, not shown) in such a way that when the film is wound to bring the next exposure area or "frame" of the film into exposure position, the spindle 54 will be rotated through about 320° in a counterclockwise direction (viewed as in FIG. 1) with simultaneous loading or tensioning of a spring as further described below, and after release is able to turn back freely in the opposite direction through the same amount, under the effect of the spring.

A control lever 58 is pivotally mounted on a pivot 10m in the camera housing, and has a rear arm 58a which is pivoted to the lower end of a link 60, the upper end of the link being pivoted to the control disk 20 at 20a. A short forwardly extending arm 58b on the control lever cooperates with the above mentioned projection or claw 54a on the gear 54 when the gear is in a certain position (see FIG. 2) and another arm 58c coacts with a latching lever 62 which is pivotally mounted at 10n and which constitutes the armature of a fixed electromagnet 64. When the parts are in the position shown in FIG. 2, the latch lever 62 underlies the arm 58c of the control lever and prevents the rear part of the control lever from dropping downward. But when the latch 62 is pulled to the pole piece 64a of the magnet 64, by energizing the magnet, the control lever 58 is free to swing downwardly unless held up by some other means.

A slide 66 is displaceable on the side wall of the camera housing 10, in a direction parallel to the optical axis, being guided by a pair of fixed studs extending through longitudinal slots in the slide. A hook-like forward end 66a on the slide lies in front of the collar 46a on the release plunger 46. A spring 68, weaker than the spring 48, tends to pull the slide 66 rearwardly. An arm 66b on the slide projects into the path of a lug 70a on a switch lever 70 which is pivotally mounted in the camera housing. Another arm 66c of the slide is so arranged that when the slide moves rearwardly, this arm 66c may engage the latch lever 62 and swing it rearwardly, and may underlie the end 58c of the control lever 58 to prevent the control lever from dropping downwardly.

At the front of the camera housing 10 is a conventional bayonet ring 10r which serves as the mounting means for the interchangeable or replaceable objective shutter unit indicated in general at 72. When the objective shutter unit is inserted in proper position on the front of the camera and turned in the familiar way, the conventional bayonet lugs 72a at the rear end of the interchangeable unit engage with the bayonet lugs 10r on the camera housing, to hold the interchangeable unit detachably on the camera body. Arranged in normal fashion in the objective shutter housing 72c are the shutter blades, the diaphragm leaves, and other components of the shutter and diaphragm mechanism, mounted in such a way that they are all moved bodily in the direction of the optical axis, relative to the fixed part 72a, by rotation of the focusing ring 72b. The parts may be arranged in conventional known fashion, such for example as the way described in German Pat. No. 1,031,630. The focusing details and the shutter and diaphragm mounting details are subject to wide variation within the common knowledge of the art, and such details are not important for purposes of the present invention.

Figure 2:
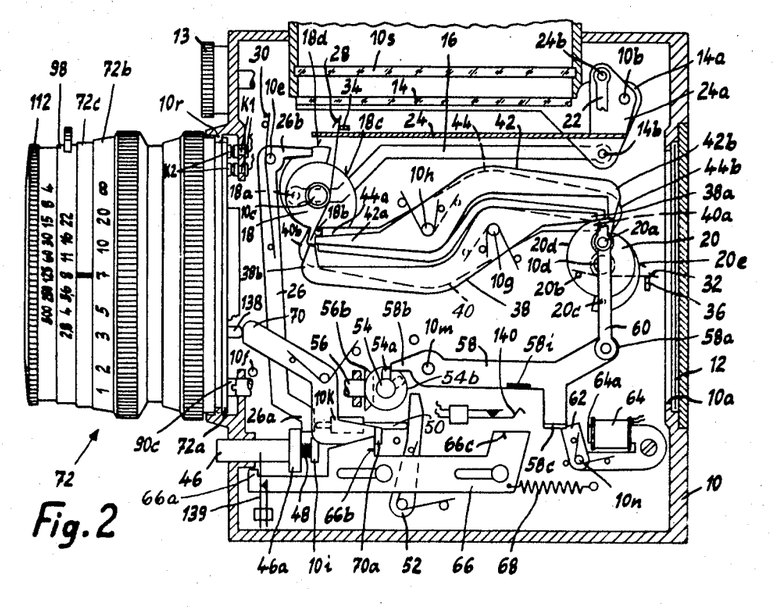
FIG. 2 is a view similar to FIG. 1 with the parts in an intermediate position during the exposure cycle.
Figure 3:
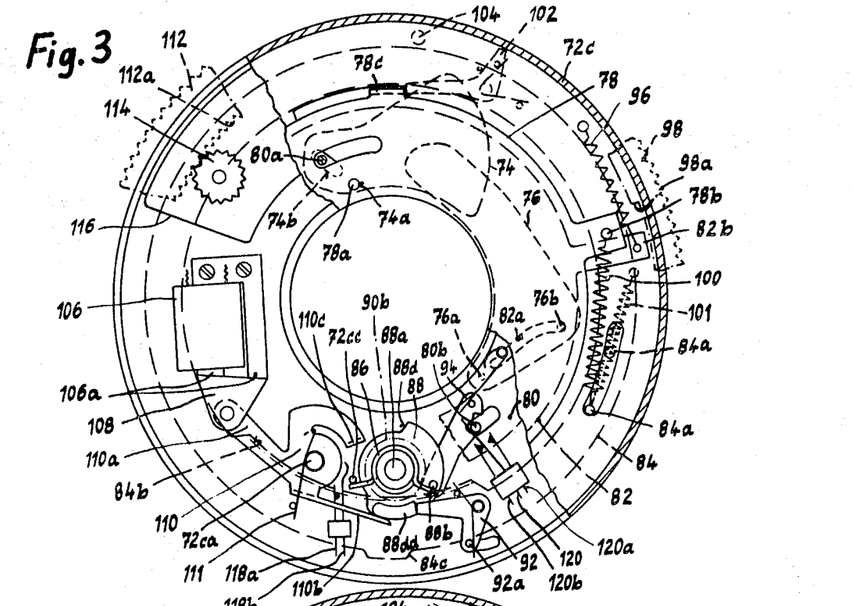
FIG. 3 is a transverse section, partly schematic, through the shutter of the interchangeable objective shutter unit with electronic timing control, being the same unit shown in FIGS. 1 and 2.
Figure 7:
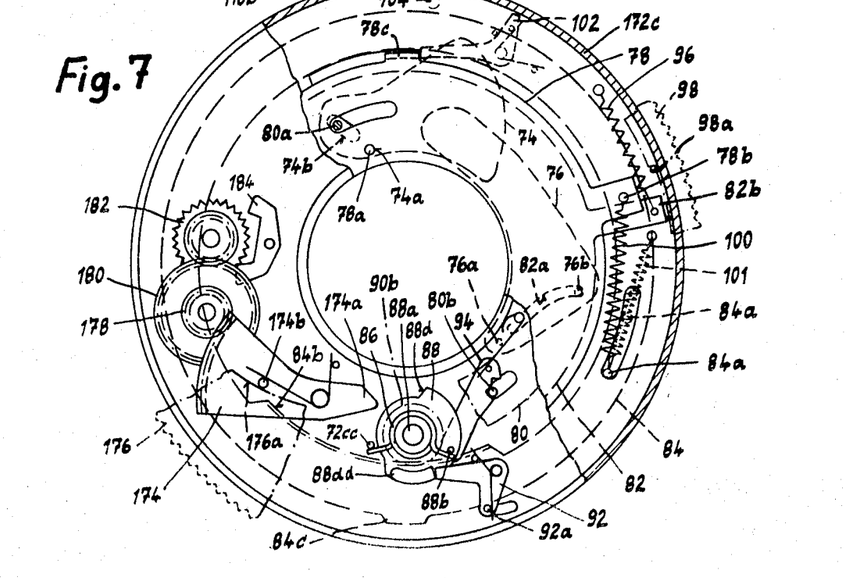
FIG. 7 is a view similar to FIG. 3 of a shutter with mechanical timing control.
Figure 8:
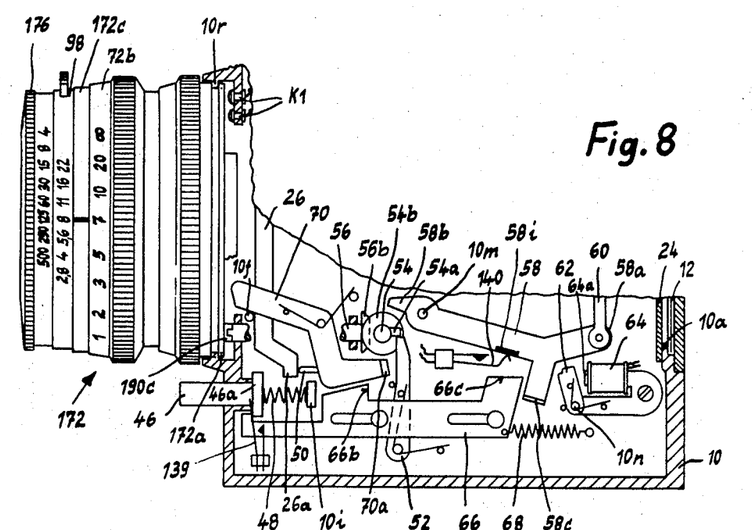
FIG. 8 is a fragmentary view similar to the lower portion of FIG. 1 but with a shutter unit which is mechanically timed rather than electronically timed, showing the parts in the same operating condition as in FIG. 1.
Figure 9:
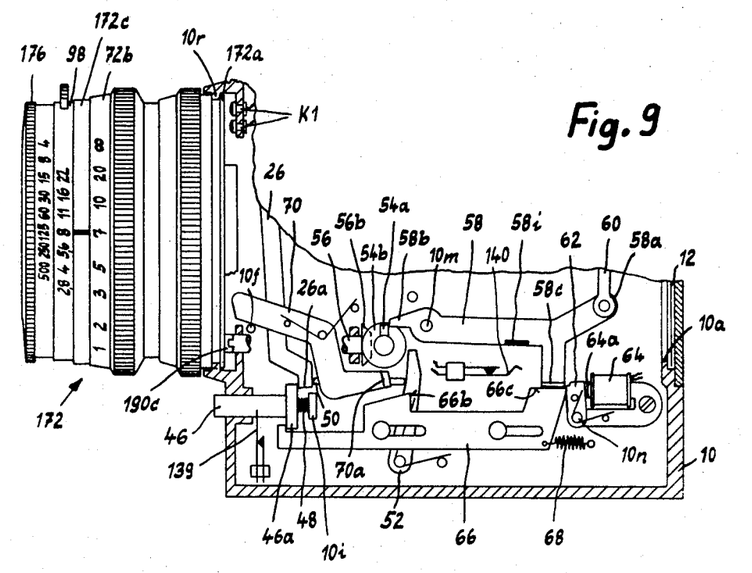
FIG. 9 is a fragmentary view similar to the lower part of FIG. 2, again showing a shutter unit which is mechanically timed rather than electronically timed, with the illustrated parts of the camera body in an operating position corresponding to that of FIG. 2.

On that part of the interchangeable unit which is axially displaceable during focusing, there is the housing portion 72c (FIGS. 1, 2, and 3) or 172c (FIGS. 7, 8, and 9) of the actual shutter. FIGS. 1-3 illustrate a shutter in which the timing is electronically controlled, while FIGS. 7-9 illustrate a shutter in which the timing is mechanically controlled, either shutter unit being selectively mountable at will on the camera, according to the present invention. In either event, within the housing 72c or 172c there are shutter blades 74 (only one of these blades being shown, for the sake of clarity) and also diaphragm leaves 76 (frequently called diaphragm blades) of which only one is shown, likewise for the sake of clarity.

Each of the shutter blades 74 has an opening 74a by which it is pivotally mounted on a pin 78a of a blade mounting ring 78 rotatable about the optical axis. Each blade also has a slot 74b receiving one of the driving pins 80a on a blade driving ring 80 also rotatable about the optical axis. Each of the diaphragm leaves 76 is pivotally mounted by means of a pin 76a in the housing 72c or 172c. Each leaf carries another pin 76b which engages in a control groove 82a in a diaphragm control ring 82. Rotatably mounted at the rear side of the housing 72c or 172c is an operating ring 84, likewise rotatable about the optical axis. This operating ring has a pin 84a which passes into the interior of the housing.

Figure 5:
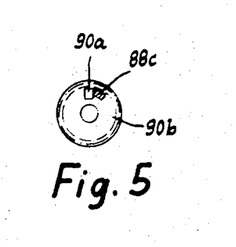
FIG. 5 is a transverse section through part of the construction shown in FIG. 4.

The main operating spring or master spring which furnishes the power for opening and closing the shutter blades is shown at 86. It is wound around the axial shank portion 88a of the main driving disk or master member 88, one end of the spring being applied against a pin 88b on the master member. The other end of the spring bears against a fixed pin 72cc fixed in the housing. A rearward projection 88c (FIGS. 4 and 5) on the master member 88 cooperates with a forward projection 90a on a pinion 90b which is fixed to the forward end of a spindle 90 which is coaxial with the master member. The pinion 90b meshes with internal gear teeth 84b on the operating ring 84. Spindle 90 is of telescopic form, as described in the above mentioned patent, and has at its rear end a diametrical coupling slot 90c which is adapted to couple with the diametrical coupling tooth 56a at the forward end of the previously mentioned shaft or spindle 56 in the camera housing, when the interchangeable unit is mounted in proper position on the camera.

The master member 88 is held in tensioned or cocked condition by a spring loaded latching lever 92 (FIGS. 3 and 7) one arm of which drops behind a projection 88dd. Another arm of this latching lever carries a pin 92a which projects rearwardly through a slot in the rear wall of the shutter housing, and cooperates with a cam-like radial projection 84c on the periphery of the operating ring 84. When the ring 84 moves counterclockwise from the position illustrated in FIGS. 3 and 7, the projection 84c will engage the pin 92a and will swing the latching lever 92 counterclockwise on its pivot, releasing the master member 88 so that it can run down in a counterclockwise direction (under the influence of the master spring 86) from its cocked or tensioned position to its rundown or rest position. During this running down movement the master member turns through approximately 180°, and operates a driving pawl 94 which is pivoted to the master member at 88b so that a pin 80b on the shutter blade driving ring is engaged by a notch near the free end of the pawl 94, first to turn the blade driving ring 80 in a counterclockwise direction to open the shutter blades 74, and then to turn the blade driving ring back in a clockwise direction to close the shutter blades.

The diaphragm control ring 82 is biased in a counterclockwise direction by a spring 96, one end of which is connected to a fixed pin in the housing and the other end of which pulls in a counterclockwise direction on a radial arm 82b on the ring 82, tending to pull this arm as far in a counterclockwise direction as permitted by the position of the abutment surface 98a on a diaphragm preselection ring 98 mounted on the periphery of the shutter housing 72c or 172c, and rotatably adjustable manually to preselect the size of the diaphragm aperture at which the exposure is to be made, as well understood in the art. Another spring 100 is stretched between a pin 78b on the blade mounting ring 78 and a pin 84a on the operating ring 84, and constantly tends to turn the ring 84 counterclockwise and to turn the ring 78 clockwise. The pin 78b on the ring 78 overlies an edge of the arm 82b on the diaphragm control ring 82 so that the clockwise motion of the ring 78 must carry the ring 82 clockwise with it. The spring 100 is more powerful than the spring 96 which tends to move the diaphragm control ring 82 counterclockwise, so that in the tensioned or cocked condition of the parts (ready to start an exposure cycle) illustrated in FIGS. 3 and 7, the spring 100 holds the shutter blade mounting ring 78 at the clockwise limit of its rotary motion and the ring 78 holds the diaphragm control ring 82 at the clockwise limit of its rotary motion, notwithstanding the tendency of the spring 96 to turn the latter ring counterclockwise. The result is that in this tensioned or cocked condition of the parts, the shutter blades 74 are fully open for viewing purposes on the focusing screen, and the diaphragm leaves 76 are likewise fully open to maximum aperture, for maximum brilliance of the image on the focusing screen.

A further spring 101, to the rear of the shutter housing proper, is anchored at one end (its upper end when viewed as in FIGS. 3 and 7) to a fixed pin, and anchored at its other end to the pin 84a on the operating ring 84, in a direction to tend to turn the ring 84 counterclockwise. This counterclockwise biasing of the ring 84 produces a corresponding biasing of the transmission train geared to the ring 84, that is, the pinion 90b, the shaft 90, the shaft 56 which is coupled to the shaft 90, and the bevel gear 54, the bias pressure being in a direction to tend to turn the bevel gear 54 clockwise when viewed from the direction of FIG. 1. However, when the parts are in the position illustrated in FIG. 1 the transmission train cannot turn in the direction in which it is biased because the projection 54a on the bevel gear 54 is engaged with the end of the latching lever 52, as illustrated.

From what has been said above, it is apparent that the spring 100 serves to bias both rings 78 and 82 simultaneously in a clockwise direction, and to bias the ring 84 at the same time in a counterclockwise direction. However, in the normal tensioned position of the parts, these rings cannot move relative to each other in the biased direction because of the latch lever 102 pivotally mounted on the operating ring 84 outside of the shutter housing proper, and having an arm extending leftwardly from its pivot (when viewed as in FIGS. 3 and 7) to engage an ear or lug 78c formed on the ring 78 and extending rearwardly through an arcuate slot in the rear wall of the shutter housing proper, into position to be engaged by the latch lever 102. A spring biases the latch lever counterclockwise on its pivot, to hold the long arm thereof in position to engage the lug 78c. But when the ring 84 turns sufficiently far in a counterclockwise direction from the position illustrated in FIGS. 3 and 7, it will carry the latching lever 102 leftwardly to a position wherein the shorter upstanding arm thereof engages a fixed pin 104, thereby turning this latching lever 102 clockwise on its pivot, releasing the longer arm thereof from the lug 78c on the ring 78, so that the ring 78 may now move clockwise relative to the ring 84.

The shutter illustrated in FIG. 3 is of a type in which the shutter timing or shutter speed is controlled electronically. For this purpose, an electromagnet 106 is incorporated in the housing 72c, and the metallic armature 108 is adapted to be pressed against the pole piece 106a of this magnet. The armature is mounted in insulated fashion on an arm 110a of a latch lever 110, which is rotatable on a pin 72ca of the shutter housing 72. A second arm 110b on the lever 100 is resilient and coacts with the projection 88dd on the master member or driving disk 88. A third arm 100c on this latch lever 100 projects into the path of the nose 88d on the master member 88.

An exposure time ring or shutter speed setting ring 112 (FIGS. 1–3) is rotatably mounted on the periphery of the housing 72c and may be turned by hand to set the desired shutter speed. The ring has internal gear teeth 112a meshing with a pinion 114 rotatable on a suitable pivot in a fixed location within the shutter housing. In any suitable conventional manner (not shown) this pinion 114 is operatively connected to the movable element or cursor of a variable electrical resistance 116 installed in the housing 72c, so that the value of the resistance 116 can be varied by rotation of the shutter speed or time setting ring 112.

Two contact springs 118a and 118b are arranged in the housing 72c, normally separated from each other as illustrated in FIG. 3, to provide an open switch at this point. When the master member or driving disk 88 turns sufficiently far in a counterclockwise direction from the initial position illustrated in FIG. 3, the projection 88d thereon engages the contact spring 118b and displaces it into contact with the other spring 118a, thus closing this switch. The shutter housing 72c also contains another electric switch comprising the resilient contact members 120a and 120b separated from each other, and between them a resilient contact member 120 which is biased to tend to swing into contact with the member 120a and out of contact with the member 120b. The end of the member 120 is in position to be engaged by the pin 80b on the blade driving ring 80, which pin holds the switch contact member 120 out of contact with the member 120a and in contact with the member 120b when the parts are in the position illustrated in FIG. 3. But when the blade driving ring 80 turns counterclockwise from the position illustrated in FIG. 3, the displacing pressure of the pin 80b on the switch member 120 is eliminated, and the switch member 120 then swings resiliently rightwardly, opening its contact with the member 120b and closing its contact with the member 120a. This switch may be referred to as the changeover switch.

Figure 6:
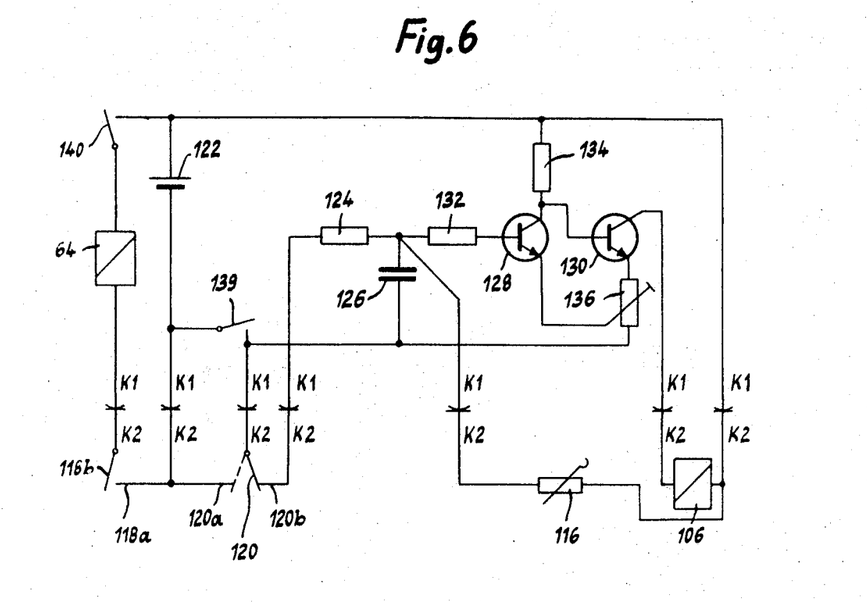
FIG. 6 is a wiring diagram of the electronic circuit connections of the camera and the interchangeable unit with electronic timing control.

The wiring diagram of the electronic control arrangement is schematically shown in FIG. 6. Current is delivered from a battery 122 suitably mounted within the camera body, to charge the time-determining capacitor 126 through the adjustable electrical resistance 116 which can be adjusted by the manual setting ring 112 as above mentioned, or can be replaced or supplemented by a photoresistance responsive to light reflected from the subject being photographed, if more automatic operation is desired. There is also a limit resistor 124 in the circuit for charging the capacitor 126. The connections include a Schmitt trigger with transistors 128 and 130, a protective resistor 132, a collector resistor 134, and the magnetic winding of the electromagnet 106. There is an adjusting or trimming potentiometer 136, and all of these parts together with the switches previously mentioned are operatively connected to each other in the manner shown in FIG. 6, which will be readily understood by those familiar with the electronic shutter control art, and need not be further described in detail.

When the interchangeable unit 72 is mounted on the camera body, the elements of the control arrangement which are carried by the interchangeable unit are electrically connected to the elements of the control arrangement which are carried by the camera body, through various conventional sliding contacts which are made or broken by the twisting movement when connecting or disconnecting the bayonet mounting parts with each other. Various ones of the fixed contacts which are mounted on the camera body are indicated schematically at K1 in FIGS. 1, 2, and 6, while various cooperating contacts carried by the interchangeable or replacement unit are indicated schematically at K2.

In addition to the switches 118 and 120 mounted in the interchangeable unit as above mentioned, the electronic circuitry also contains switches 139 and 140 mounted in the camera housing and operatively connected in the circuit in the manner illustrated in FIG. 6. As shown in FIGS. 1 and 2, the switch 139 is biased in a closing direction and is held open by the flange 46a on the release plunger or trip member 46 when the latter is in its normal position. When the trip member is pressed inwardly to initiate an operating cycle, the opening pressure on the switch 139 is relieved so that the switch closes. The other switch 140, as also shown in FIGS. 1 and 2, is likewise biased in a closing direction, but is held open by an insulated part 58i on the lever 58 when the latter is in its downwardly swung position illustrated in FIG. 1. When the lever is swung upwardly from this position, the opening pressure on the switch 140 is relieved, and the switch closes.

Each of the interchangeable objective shutter units in which the shutter speed or time is controlled electronically is provided with some definite different construction at the rear end thereof, which may be referred to as a "structural variation," as compared with interchangeable units in which the shutter speed or timing is controlled mechanically rather than electronically. The structural variation may take various forms, but must provide some feature which is recognizable by the mechanism in or on the camera body, so that the control mechanism of the camera body will recognize that it is now dealing with an objective shutter unit which is now electronically controlled rather than with a unit which is mechanically controlled, and this recognition should follow automatically from the mere attachment of the interchangeable unit in proper position on the camera body, without requiring any special switching or manipulation by the operator to indicate which type of interchangeable unit has been attached to the body. In the preferred form of the invention, a suitable structural variation is formed by the pin 138 (FIGS. 1 and 2) which is present on the interchangeable unit if it is an electronically controlled unit, and which is absent from those interchangeable units in which the shutter is timed mechanically rather than electronically. As the shutter unit is twisted into engaged or mounted position on the bayonet lugs of the camera body, the projecting pin 138 will engage with the forwardly and upwardly extending feeler end of the latching lever 70 and will swing this latching lever slightly clockwise on its pivot, to bring the rear end 70a thereof downwardly behind an abutment shoulder 66b on the slide 66, as shown in FIG. 1, thereby preventing the slide 66 from moving rearwardly under the influence of its spring 68 even when the trip or trigger member 46 is pressed inwardly or rearwardly, which would otherwise release the slide for rearward movement. But if the interchangeable shutter unit mounted on the camera body is mechanically timed rather than electronically timed, it does not have this projecting pin 138, and so when it is mounted on the camera body it does not displace the feeler lever 70. The feeler lever therefore remains in its counterclockwise position in which it is biased by its spring, and the lug 70a thereon remains in its upper position, out of the path of travel of the shoulder 66b on the slide 66 (compare with FIGS. 8 and 9) so that the slide 66 can move rearwardly when the camera trip or trigger 46 is moved rearwardly. This renders the electronic control parts within the camera body ineffective, and renders the mechanical control parts effective, appropriate to cooperate with the mechanically controlled shutter in the interchangeable unit, as further described below.

FIG. 7 illustrates the shutter mechanism of an interchangeable objective shutter unit 172 which has a mechanical control arrangement for determining the exposure time or shutter speed, as distinguished from the electronic arrangement in the shutter unit previously described. In this mechanically timed unit, the shutter blades 74, the diaphragm leaves 76, and the various rings 78, 80, 82 and 84 are arranged in the same way as in the previously described shutter, and the same reference numerals are used in FIG. 7 for the corresponding parts already described in connection with FIG. 3, so that no further explanation of these parts or their mode of operation is needed. Moreover, the movements of these parts are brought about by a master spring 86 and a master member 88 in the same way as in the construction shown in FIG. 3. The shutter housing, designated in FIG. 3 as 72c, is designated in FIG. 7 as 172c.

The difference between the two shutters is in the control of the shutter speed or exposure time. In the mechanically controlled shutter of FIG. 7, instead of using the electromagnet 106, the armature 108, and the lever 110 which were used in the electronic shutter, there is a mechanical delay mechanism of known type, preferably but not necessarily a delay mechanism of what is known in the art as a clockwise type or gear train type. For example, there is what may be called a primary delaying element 174 pivoted on a fixed pivot and having a nose 174a for cooperation with the surface 88d on the master member 88. A light spring biases the element 174 in a counterclockwise direction, to hold a pin 174b thereof against the setting cam surface 176a of the shutter speed or exposure time setting ring 176 rotatable externally on the shutter housing. The setting of the ring 176 determines the starting position of the primary member 174.

The element 174 also includes a gear tooth segment concentric with the pivot on which the element swings. The toothed segment engages a delaying gear train of any conventional construction; for example, the segment may mesh with a small pinion 178 connected with a larger gear 180 which, in turn, meshes with the teeth of a pinion on a star wheel 182 the teeth of which are engaged by a vibrating anchor or pallet 184. Time delaying gear train constructions of this general type are well known in the photographic shutter art, and the details thereof are not important for purposes of the present invention, which is applicable to a shutter unit having any known form of mechanical delaying means for determining the length of the exposure. The diaphragm aperture preselector mechanism, including the selector ring 98 having the abutment shoulder 98a for cooperation with the ring 82, may be the same in this mechanically timed shutter as in the electronically timed shutter previously described.

The electric switch parts 118a, 118b, 120, 120a, and 120b, which are present in the electronically timed shutter, and the associated electrical conductors, are omitted from the mechanically timed shutter. Likewise the electric contacts K2 which are present on the electronically timed shutter are absent from the mechanically timed shutter. However, the mechanically timed shutter includes bayonet joint connections 172a and a spindle 190c, identical with the elements 72a and 90c of the electronic shutter, thus enabling the mechanically timed shutter to be mounted on the bayonet connection ring or mounting element 10r of the camera housing, in exactly the same way as the electronically timed shutter. There is, however, an important and recognizable structural difference or "structural variation" in the portion of the mechanical shutter housing which cooperates with the camera housing, as compared with the corresponding portion of the electronic shutter housing which cooperates with the camera housing. As already explained above, this "structural variation" may take various forms so long as it serves to condition the mechanism within the camera housing for proper operation with the one or the other type of shutter, as the case may be. In the preferred embodiment of the invention illustrated as an example, the "structural variation" comprises, as already explained above, the presence of the rearwardly projecting pin 138 on the housing of the electronically controlled shutter unit, and the absence of any such pin on the housing of the mechanically controlled shutter unit.

The operation is as follows:

The appropriate interchangeable objective shutter unit is mounted on the front of the camera body by the usual twisting motion familiar to those acquainted with bayonet mounts as used in photographic apparatus. Assuming that the unit applied to the camera is an electronically controlled shutter unit, and that the film feeding mechanism has been operated to bring the various elements to their cocked or tensioned positions, the parts will be in the positions illustrated in FIGS. 1 and 3. The cover flap 24 is in its protecting position, preventing light from reaching the film 12, and the mirror 14 is in its down or viewing position, so that the scene to be photographed may be viewed on the ground glass focusing screen 10s, since the shutter blades 74 and the diaphragm leaves 76 are in their fully open positions. The correct distance may be set by rotation of the focusing ring 72b. The desired shutter speed or exposure time, and the diaphragm aperture at which the picture is to be taken, may be set by turning the setting rings 112 and 98, respectively.

During the twisting motion while mounting the interchangeable unit 72 in position on the camera body, the "structural variation" element or selector pin 138 has engaged the lever 70 and swung it in a clockwise direction on its pivot, so that the latching lug 70a thereof has come down behind the shoulder 66b on the slide 66, to prevent the slide 66 from moving rearwardly. Then when the camera trip or trigger member 46 is pressed inwardly (rearwardly) to initiate the operating cycle, the holding pressure of the flange or collar 46a against the upstanding lug at the front end of the slide 66 is relieved, but nevertheless the slide cannot move rearwardly. The collar 46a on the trip member presses the lower end of the latch lever 26 rearwardly, and this accomplishes two things. It displaces the latching nose 26b from the pin 18b so that the control disk 18 can now start to turn counterclockwise. Simultaneously, it moves the pin 50 rearwardly so that the pin engages the latching lever 52 and swings this latching lever rearwardly to release the projection 54a on the bevel gear 54b, so that the bevel gear and its associated transmission train may begin to run down. Also, the rearward movement of the camera trip member 46 has allowed the resilient electric switch 139 to close, to activate the electronic circuit ready for its shutter timing function, as will be further mentioned below.

When the control disk 18 starts to turn counterclockwise, the end 40b of the lever 40 drops behind the shoulder at the trailing end of the cam portion 18d, so that the lever 40 turns slightly in a clockwise direction on its pivot, and its opposite end 40a, comes down onto the upper edge of the pin 20c of the other control disk 20, which is still held against rotation at this time by engagement of the pin 20c with the end 38a of the lever 38. As the control disk 18 continues its counterclockwise running down movement under the influence of its spring 28, it draws forwardly on the link 16 and this swings the mirror carrier 14a clockwise, to swing the mirror 14 up from the viewing position shown in FIG. 1 to the exposure or picture-taking position shown in FIG. 2. This upward swinging of the mirror is completed when the disk 18 has turned through about 180°, and the disk is now held in this position by the pin 18b thereof striking the end 42 a of the lever 42.

Just before the disk 18 reaches this position in which its movement is stopped, the end 38b of the lever 38 drops down behind the shoulder at the trailing end of the cam portion 18c. This swings the lever 38 slightly in a clockwise direction, so that the opposite end 38a thereof swings out of the path of the pin 20c on the other control disk 20, enabling this disk 20 to start its counterclockwise running down movement under the influence of its spring 32. The first half of this running down movement of the disk 20, through an angle of about 180°, pushes upwardly on the link 22, thereby swinging the carrier 24a and the protecting flap 24 in a clockwise direction, from the position shown in FIG. 1 to the position shown in FIG. 2, uncovering the exposure aperture 10a so that light entering through the lens may now reach the film to make the desired exposure. This half revolution of the disk 20 has not only pushed upwardly on the link 22, but also has pulled upwardly on the link 60, raising the lever 58 from the position shown in FIG. 1 to the position shown in FIG. 2, in which second position the armature latch 62 snaps under the end 58c of the lever 58, preventing the lever from descending again until the armature latch is released. This serves to hold the disk 20 in the position mentioned (approximately half way rundown) since it cannot turn any further without moving the lever 58 downwardly, and the lever 58 cannot move downwardly on account of the latch. It will be noted that the upward movement of the lever 58 has served to bring the end 58b thereof into the path of travel of the projection 54a on the bevel gear 54b, and has also served to allow the resilient electric switch 140 to close.

Shortly after the control disk 20 starts to run down, the end 44b of the lever 44 drops behind the shoulder and the trailing edge of the cam portion 20e so that the other end 44a of the lever 44 swings slightly upwardly into the path of travel of the pin 18b on the control disk 18. By the time the control disk 20 completes half a revolution, the cam 20d thereon has raised the end 42b of the lever 42 to swing this lever so that the opposite end 42a thereof swings out of the path of travel of the pin 18b on the disk 18. This disk 18 may then perform a very slight additional rotation, until the pin 18b comes up against and is stopped by the end 44a of the lever 44, which is slightly shorter than the end 42a of the lever 42. The parts are now in the positions shown in FIG. 2.

It will be remembered that the rearward motion of the trip member 46 not only released the latch part 26b so that the disk 18 could start its running down movement, but also released the latch 52 so that the transmission train 54, 56, etc., could start its running down movement under the influence of the spring 101. This running down movement proceeds until the projection 54a reaches the position shown in solid lines in FIG. 2, where it engages with and is stopped by the end 58b of the lever 58, which meanwhile has been brought up to the position shown in FIG. 2. During this running down of the parts 54, 56 and the associated shaft 90, the operating ring 84 turns counterclockwise, carrying its pin 84a from the full line position to the dotted line position of FIG. 3. The shutter blade mounting ring 78 is carried along counterclockwise with the ring 84, through the connection provided by the pawl 102. The shutter blades 74 are thereby closed, and the closing movement is completed before the commencement of the opening movement of the cover flap 24 in the camera body. The diaphragm control ring 82 follows along in a counterclockwise direction under the power of its own spring 96, until it is stopped by engagement with the shoulder 98a of the diaphragm preselector ring 98, thereby closing the diaphragm leaves 76 down to the previously selected aperture size. Shortly after this closing of the shutter blades and closing down of the diaphragm leaves is completed, the projection 54a comes up against and is stopped by the latching nose 58b of the latching lever 58, thereby temporarily stopping the running down movement of the transmission parts 54, 56, 90 and the operating ring 84 at an intermediate position.

Shortly before these parts 54, 84 reach the intermediate position just mentioned, the cam portion 84c on the operating ring 84 engages the pin 92a on the latching lever 92 and swings the latching lever away from the projection 88dd on the master member 88, so that the master member or main driving member 88 is now released to start its counterclockwise running down movement under the influence of the master spring 86. During this running down movement, the connecting link 94, acting on the pin 80b of the shutter blade driving ring 80, turns the rings 80 in a counterclockwise direction to open the shutter blades for making the exposure. Right at the commencement of this opening movement, the movement of the pin 80b causes the movable switch contact member 120 to move away from the contact member 120b and into engagement with the contact member 120a. When the master member 88 has completed about one-half of its running down movement, such movement is temporarily stopped (in a position in which the shutter blades 74 are fully open) by engagement of the shoulder 88d on the master member with the end 110c of the member 110, and the running down movement cannot be completed (to close the shutter blades again) so long as the arm 110c remains in the way. The member 110 is held in the obstructing position by reason of the fact that right at the beginning of operation of the trip member 46, the switch 139 was closed, and this has the effect of energizing the winding of the electromagnet 106, since at this time the transistor 130 is conductive. Therefore, the armature 108 is held against the magnet 106, maintaining the member 110 in position to obstruct the rotation of the master member.

The electronic control arrangement is brought into effective operation by the shifting of the contact member 120 from the member 120b to the member 120a, which occurred, as above stated, right at the commencement of the opening movement of the shutter blades. Upon the shifting of this switch member 120, a charging current now begins to flow into the capacitor 126 through the manually adjusted regulating resistor 116, and this flow continues until the base of the transistor 128 exceeds its emitter voltage. At this moment the trigger flops over and the transistor 128 then becomes conductive, and the transistor 130 is completely blocked. The electromagnet 106 thus becomes de-energized, and its armature 108 can drop rapidly away under the action of the spring 111 acting on the lever 110. The lever 110 therefore turns in a counterclockwise direction on its pivot, carrying the part 110c away from the cam shoulder 88d of the master member, permitting the master member to continue its counterclockwise running down movement through approximately the second half thereof, until the shoulder 88d strikes the fixed abutment pin 72cc which stops further movement.

During this second phase of the running down movement of the master member, the link 94 turns the shutter blade driving ring 80 in a clockwise direction, closing the shutter blades 74 and terminating the exposure. At the end of the running down movement, just before the motion is stopped by engagement with the fixed pin 72cc, the shoulder 88d engages the switch member 118b and closes this switch. This energizes the electromagnet 64, which now pulls its armature 62 which served as a latch for the lever 58, so that the lever 58 is released to move downwardly, enabling the counterclockwise rotation of the control disk 20 to resume.

Shortly before the completion of the downward swinging movement of the control lever 58, the latching end 58b thereof releases the projection 54a on the spindle 54, thus enabling this spindle and associated parts to turn slightly further, from the position of the projection 54a illustrated in full lines in FIG. 2, to the position illustrated in dotted lines in the same view, which is the end position or limit position of this lug 54a. This slight additional movement permitted for the projection 54a allows the operating ring 84 to turn slightly further in a counterclockwise direction, far enough to carry the upstanding arm of the latch 102 into engagement with the fixed abutment 104, to swing the latch to release the lug 78c from the long arm of the latch. This position wherein the latch is released represents the extreme or limit counterclockwise position of the operating ring 84, which now remains in this position until the mechanism is once more cocked or tensioned ready for the next exposure, by operation of the film winding knob 13. However, the release of the latch 102 at this time enables the spring 100 to turn the shutter blade mounting ring 78 clockwise to open the shutter blades for viewing, carrying with it the diaphragm control ring 82 in a clockwise direction, to open the diaphragm leaves to maximum aperture for viewing. This opening of the shutter blades for viewing does not occur until after the control disk 20 has almost completed the second half of its running down motion and has brought the cover flap 24 into protective position with respect to the film 12. Near the end of the running down movement of the control disk 20, the cam edge 20e thereof lifts the arm 44b of the lever 44 sufficiently far so that the opposite end 44a of this lever releases the pin 18b of the control disk 18. This control disk, previously stopped at an intermediate point approximately half way through its full running down motion, may now resume its motion and complete the second half thereof, swinging the reflex mirror 14 back from the picture taking position shown in FIG. 2 to the viewing position shown in FIG. 1, reflecting the incoming light beam up to the ground glass focusing screen 10s.

When the film feed knob 13 is operated to advance the film strip 12 to bring the next frame area into exposure position, the springs 28 and 32 of the respective control disks 18 and 20 are again loaded by complete rotation of the spring abutment elements 34 and 36 through one revolution around the axis of their respective control disks. The spindle 54 is also turned counterclockwise from the run down limit position schematically shown by the dotted line position of the projection 54a in FIG. 2, back to the tensioned or cocked position shown schematically by the full line position of the projection 54a in FIG. 1. Through the transmission parts 56, 90, and 90b, the operating ring 84 of the shutter is turned back in a clockwise direction from its run-down position to its tensioned position, bringing the pin 84a thereon to the position shown in full lines in FIG. 3. At the same time, the rotation of the spindle 90 acts, through the coupling teeth 90a and 88c, to turn the master member 88 back in a clockwise direction from its run down position to its tensioned position shown in FIG. 3. During this tensioning motion of the master member 88, the cam formation 88dd slides under the resilient arm 110b of the lever 110 and turns this lever in a clockwise direction to apply the armature 108 against the pole piece 106a of the magnet 106, and to hold it mechanically in this position even though the magnet is not energized at this time. Thus, upon completion of the tensioning or cocking operation as a result of the operation of the film winding mechanism, the parts are restored to the positions illustrated in FIGS. 1 and 3, and the mechanism is ready for operation through another exposure cycle.

If an interchangeable objective shutter unit with a mechanically timed shutter is to be used in place of one having an electronically timed shutter, then the mechanically timed unit 172, shown in FIGS. 7, 8, and 9, is applied to the front of the camera body, in place of the electronically timed unit 72. Because of the difference in structure between the two units, the mechanical unit having no structure corresponding to the pin 138 of the electronic unit, it follows that when the mechanically timed unit is twisted into position on the front of the camera body, it will not cause any displacement of the feeler lever 70 within the camera housing. Thus the feeler lever 70 remains at the counterclockwise limit of its motion, determined by engagement with the fixed pin 10f. In this position, the slide 66 is not obstructed by the end 70a of the feeler lever 70, and the slide is free to move rearwardly when the trip or trigger member 46 is pressed rearwardly. The shutter housing 172c has no electronic elements, and the sliding contact parts K2 are not present. The parts of the electronic circuitry which are mounted in the camera housing are still present, of course, but they are not ready for nor capable of operation when a mechanically timed shutter unit is applied to the camera housing. In the cocked or tensioned condition, the parts are in the positions illustrated in FIGS. 7 and 8.

When the release member or trigger 46 is operated to start the exposure cycle, the reflex mirror 14 and the protecting cover flap 24 are moved out of the way in a manner similar to that described in connection with FIGS. 1 and 2, the only difference being that the downward swinging movement of the lever 58 is prevented not by a latch 62 formed as the armature of the magnet 64, but rather by the arm 66c near the rear of the slide 66, which slide is pulled rearwardly by its spring 68 when the trigger 46 is operated. Since the exposure time is controlled by the mechanical delay mechanism, the slide 66 receives no feedback signal from the shutter mechanism, and therefore the user must hold the trip member 46 in the release position or actuated position shown in FIG. 9, until the shutter has completed its exposure cycle. The recognizable run down noise gives the user the signal to release the rearward pressure on the trip member 46 when the exposure is completed, so that the slide 66 can be drawn forwardly (to the left when viewed as in FIGS. 8 and 9) by the spring 48, which is more powerful than the spring 68. This will release the arm 58c so that the lever 58 may swing downwardly and the operating cycle can be completed. When the slide 66 has moved forwardly, thereafter the procedures for reopening the shutter blades 74 and the diaphragm leaves 76 for viewing, and for swinging the mirror 14 and flap 24, and for loading the various power sources by movement of the film feed mechanism, are performed in a way similar to those described above in connection with the electronic shutter.

In order to relieve the user of even the slight degree of attention which is required to be exercised during operation of the trip or trigger member 46, a catch or detent or the like cooperating with the trip member 46 may be provided in the camera, to hold this member in the rearward position illustrated in FIG. 9. The catch or detent may then be retracted only after the shutter is run down, and this may be done either manually or by a member actuated by the cam nose 88d on the master member 88, which in its end position or limit position releases the catch or detent which held the trip member 46 in its rearward position, allowing it to move forwardly again from the position of FIG. 9 to the position of FIG. 8, so that the operating cycle of the flap 24 and mirror 14 may be completed.

It is seen that with this camera there is great versatility, enabling the use, with the same camera body, either of modern interchangeable objective shutter units or assemblies embodying the latest electronic control arrangements, or of older interchangeable units or assemblies which have mechanical control, and which the user may already have or may be able to obtain at less cost than the newer and more modern electronic assemblies.

What is claimed is:

1. A photographic still camera comprising a housing having mounting means for interchangeably mounting objective shutter units equipped either with mechanical exposure timing means or with electronic exposure timing means, such shutter units in both cases having actuating means for cocking and release of a shutter system, movable operating means including shutter release means in said housing, and control means in said housing for synchronizing the actuating means in the shutter unit with the operating means in the housing, said control means including a control member (58) and latching means (62, 66) associated therewith and having a manually actuated latch member (66) and an electromagnetically actuated latch member (62) operated by an electromagnet (64) operatively connected to said electronic exposure timing means, said camera further including a movable member (70) on the housing actuated by a portion (138) on a shutter unit (72) equipped with electronic exposure timing means when such shutter unit is mounted on said housing, said movable member (70) when so actuated serving to prevent the manually actuated latch member (66) from cooperating with the control member (58) and to permit the electromagnetically actuated latch member (62) to cooperate with said control member, said movable member (70) when not actuated by said portion (138) permitting the manually actuated latch member (66) to cooperate with said control member (58).

2. A camera as defined in claim 1, wherein the camera is a single lens mirror reflex camera, and in which an operative connection between said operating means in said housing and said actuating means in said shutter unit is provided by a shaft, and in which a reflex mirror (14) is movably mounted in said housing, characterized by the fact that said control member (58) cooperates with a projection (54a) on said shaft (54) and with a member (60) constituting part of actuating means for moving said reflex mirror (14) and has an arm (58c) for engagement with one of said latch members (62, 66) depending upon which one of said latch members is then in operating position.

3. A camera as defined in claim 1, wherein one latch member (62) constitutes the armature of an electromagnet (64) and wherein the other latch member is in the form of a slide (66) movable from an ineffective position to an effective latching position and serving when in its effective latching position to hold said armature in its unlatching position.

4. A camera as defined in claim 1, wherein said camera includes a blocking member (70) for blocking movement of one of said latch members (66) to its latching position, said blocking member being biased toward an ineffective position, and wherein the interchangeable shutter unit which has electronic timing control also has a selector element (138) effective during the act of mounting such unit on the camera to shift said blocking member to an effective position to prevent said latch member (66) from moving to its latching position so long as such unit having electronic timing control remains mounted on the camera.

5. A camera as defined in claim 1, characterized by the fact that said electronic timing means and said electromagnet (64) are parts of electric circuit means arranged partly in the camera and partly in the interchangeable shutter unit having electronic timing means, and are supplied with current from a common current source (122), the portion of the circuit means in the shutter unit being operatively connected automatically to the portion of the circuit means in the camera by cooperating contacts (K1, K2) brought into engagement with each other by the act of mounting the shutter unit on the camera.

6. A photographic camera comprising a body having means thereon for detachably and interchangeably mounting selectively either an objective shutter unit in which shutter timing is controlled electronically or an objective shutter unit in which shutter timing is controlled mechanically, said body having therein a control member movable during an exposure cycle and an electrically operated latch and a mechanically operated latch for controlling movement of said control member, and sensing means mounted in the camera body for sensing which one of said shutter units is mounted thereon and for determining which of said two latches shall be effective to control movement of said control member, so that said electrically operated latch will control said movement while an electronically timed shutter unit is mounted on said body and said mechanically operated latch will control said movement while a mechanically timed shutter unit is mounted on said body.

* * * * *